United States Patent [19]
Reinfelder et al.

[11] Patent Number: 5,320,494
[45] Date of Patent: Jun. 14, 1994

[54] HELICOPTER ROTOR BLADE HAVING A REPLACEABLE ANHEDRAL TIP

[75] Inventors: William C. Reinfelder, Woodbridge; Jeffry C. Purse, Branford, both of Conn.

[73] Assignee: United Technologies Corporation, Hartford, Conn.

[21] Appl. No.: 994,844

[22] Filed: Dec. 22, 1992

[51] Int. Cl.$^5$ .............................................. B64C 11/26
[52] U.S. Cl. ..................................... 416/226; 416/228; 416/229 R; 416/230; 29/889.6; 29/889.71; 156/92; 156/98; 156/344; 264/257
[58] Field of Search .......... 416/224, 226, 228, 229 R, 416/229 A, 230; 156/91, 92, 94, 98, 304.5, 344; 264/257; 29/889.1, 889.6, 889.71

[56] References Cited

U.S. PATENT DOCUMENTS

| | | | |
|---|---|---|---|
| 3,105,557 | 10/1963 | Wigal | 416/226 |
| 3,874,820 | 4/1975 | Fenaughty | 416/226 |
| 4,324,530 | 4/1982 | Fradenburgh et al. | |
| 4,334,828 | 6/1982 | Moffitt. | |
| 4,470,862 | 9/1984 | More et al. | 416/226 |
| 4,648,921 | 3/1987 | Nutter, Jr. | 416/226 |
| 4,784,575 | 11/1988 | Nelson et al. | 416/226 |
| 5,042,968 | 8/1991 | Fecto | 416/226 |

FOREIGN PATENT DOCUMENTS 0961466  1/1975  Canada ............................ 416/226

Primary Examiner—Edward K. Look
Assistant Examiner—Christopher Verdier
Attorney, Agent, or Firm—Michael Grillo

[57] ABSTRACT

A replaceable tip portion (20) for a helicopter rotor blade (14) is selectively swept, tapered and anhedral. The tip portion is formed of an upper and lower composite tip skin layer (35), each tip skin layer having bonded thereto a honeycomb core (38). The density of the core varies from a leading edge of the tip to a trailing edge of the tip from a high density to a lower density. A channel (recess) (40) is formed in the honeycomb for receiving a rotor spar tip end (30), and the tip portion is removably attached (60) to the rotor spar and the remainder of the rotor blade. The honeycomb core is attached to the upper and lower tip skin layers in halves, and is machined along the rotor blade chord plane (70) prior to assembly of the halves on the rotor spar, the machined core providing tight tolerance control in the construction of the blade tip portion. A composite tip cap (50) is fixed to the extreme tip end of the removable anhedral tip portion, the mating surface of the tip cap which is joined to the removable tip is machined to provide a precise joint.

16 Claims, 3 Drawing Sheets

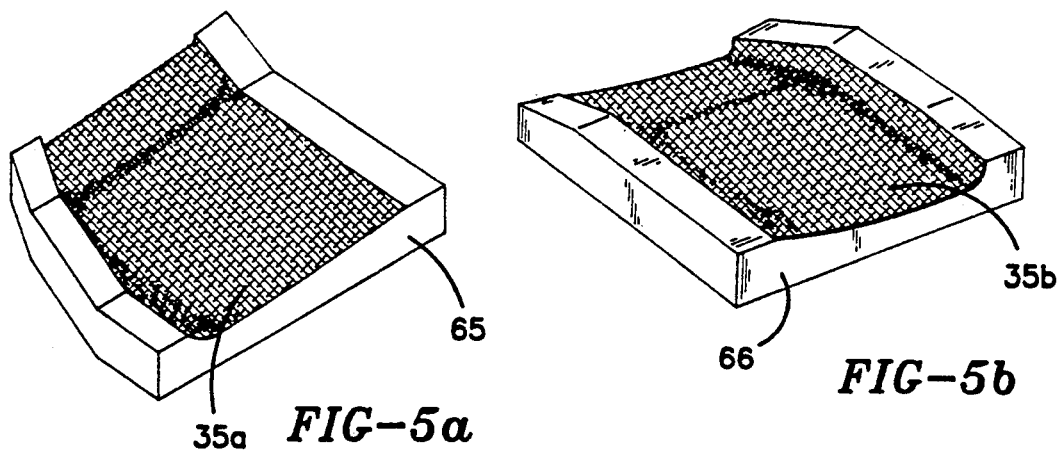
FIG-5a
FIG-5b
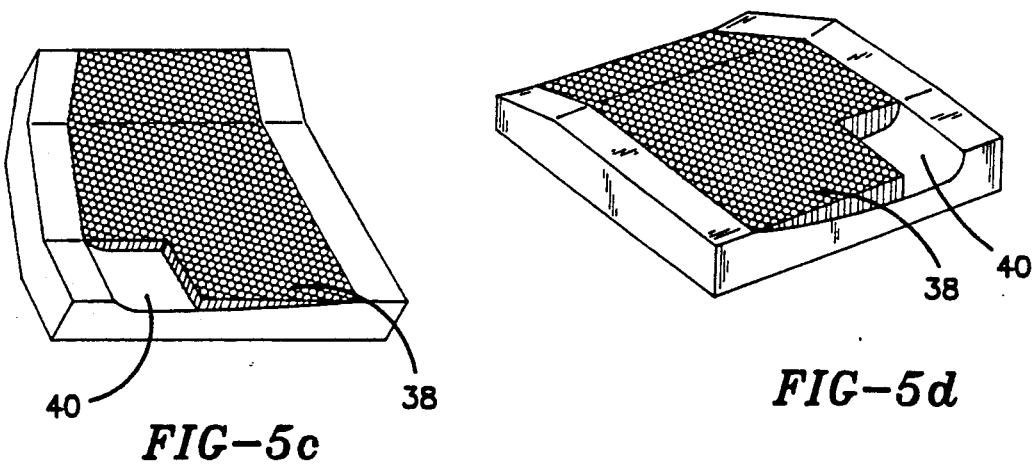
FIG-5c
FIG-5d
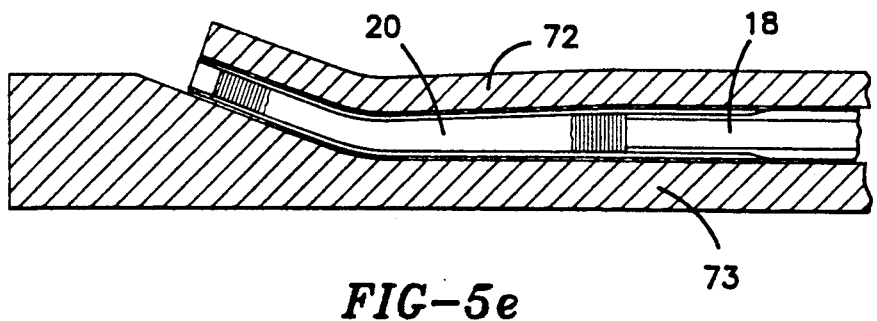
FIG-5e
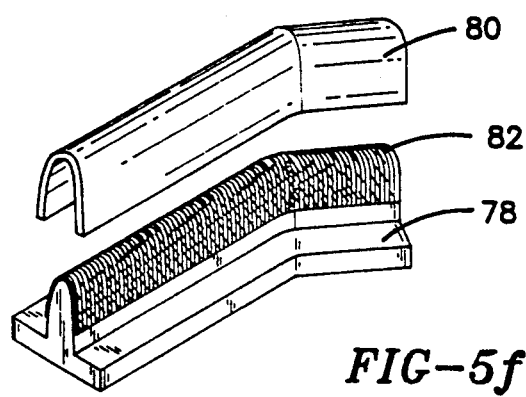
FIG-5f

HELICOPTER ROTOR BLADE HAVING A REPLACEABLE ANHEDRAL TIP

DESCRIPTION

1. Technical Field

The present invention relates to helicopter rotor blades, and more particularly to an improved blade having a replaceable composite anhedral tip.

2. Background Of The Invention

It is well known in the helicopter art to use a rotor blade having a tip of selected sweep, taper, and anhedral form to improve the blade performance. For example, in commonly owned U.S. Pat. Nos. 4,324,530 and 4,334,828, rotor blades are disclosed having a swept tip portion characterized by a moderate leading edge sweep and unswept extreme tip edge. Both rotor blades utilize a constant span anhedral in order to displace the trailing edge vortices which form the rotor wake downwardly away from the following blade in order to improve hover performance of a helicopter on which the blades are fitted.

It is also well known in the helicopter art to provide a sacrificial or removable tip cap to be attached to the extreme end of a rotor blade. This extreme end of the blade is subject to the greatest aerodynamic forces and also suffers the greatest results of wear and abrasion during rotor operation. Therefore, it has been found that a replaceable tip cap will often allow the repair of a damaged rotor blade without removal of the rotor blade to the original manufacturer for repair.

A problem associated with the aforementioned removable tip cap is that because of its size it is hard to manufacture to the precise measurements required to be fitted on the end of the rotor blade. Therefore, hands-on work to file or otherwise size the tip cap is often required to prepare it for attachment to the end of a rotor blade. Additionally, if a rotor blade is damaged other than to the tip cap, the entire blade must be returned to the manufacturer for repair. The most frequent blade damage is to the tip portion caused during handling of the helicopter wherein the tip portion of the rotor blade strikes a fixed object in a hangar or on a landing strip. Additionally, the entire tip portion of the rotor blade is subject to a high degree of wear and abrasion during operation of the helicopter, and this frequently leads to the requirement to have the rotor blade repaired prior to continued operation.

DISCLOSURE OF INVENTION

Objects of the invention include provision of an improved helicopter rotor blade having a replaceable anhedral tip portion.

Another object of the present invention is to provide a helicopter rotor blade having an anhedral tip portion which is replaceable at the depot level and a tip cap portion which is replaceable at the field level.

A further object of the present invention is to provide a replaceable tip portion for a helicopter rotor blade which is easy to manufacture in a highly accurate and repeatable manner.

According to the present invention, a helicopter rotor blade comprises a replaceable tip portion which is selectively swept, tapered and anhedral to thereby unload the tip to achieve a more uniform lift distribution throughout the span of the blade and similarly producing a more uniform downwash effect, while decreasing the power required to drive the rotor, the tip portion being formed of an upper composite tip skin layer and a lower composite tip skin layer, each tip skin layer having bonded thereto a honeycomb core, the density of the core varying from a leading edge of the tip to a trailing edge of the tip from a high density to a lower density, a channel (recess) being formed in the honeycomb for receiving a rotor spar tip end, and the tip portion being removably attached to the rotor spar and the remainder of the rotor blade.

In further accord with the present invention, the honeycomb core is attached to the upper and lower composite tip skin layers in halves, and is machined along the rotor blade chord plane prior to assembly of the halves on the rotor spar, the machined core providing tight tolerance control in the construction of the blade tip portion.

The rotor blade of the present invention provides a significant improvement over prior rotor blades because an anhedral tip portion is removably attached to the end of the rotor blade to provide the significant advantages of an anhedral tip and at the same time providing the maintenance advantages of a replaceable blade tip. If a rotor blade is damaged in the tip portion, the tip can be replaced without replacing the entire rotor blade. Additionally, the removable tip is configured to be replaced at the depot level, rather than requiring the manufacturer to replace the tip. The tip cap used with the present invention is of a smaller size, and therefore, it can be reproduced with more precise tolerances. The tip cap of the present invention can be easily replaced at the field level.

Other objects, features and advantages of the present invention will become more apparent in light of the following detailed description of exemplary embodiments thereof as illustrated in the accompanying drawings.

BRIEF DESCRIPTION OF THE DRAWINGS

FIGS. 5a–5f show the sequence for assembly of the replaceable anhedral tip of FIG. 2.

BEST MODE FOR CARRYING OUT THE INVENTION

Figure 1:
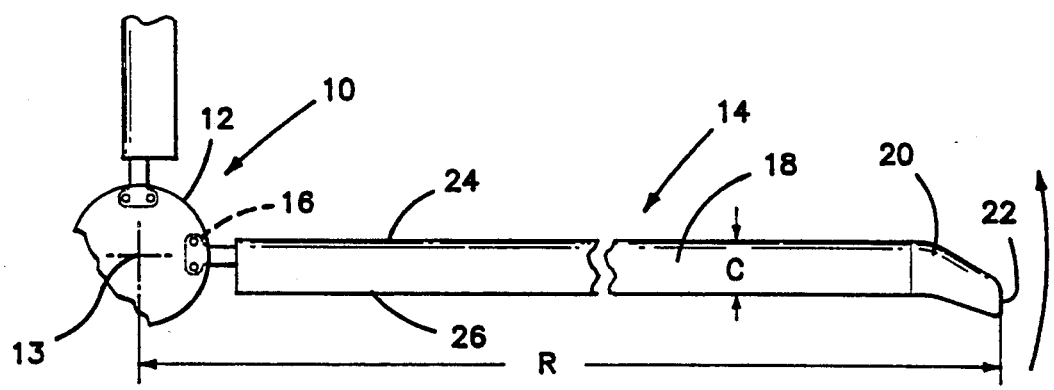
FIG. 1 is a partial plan view of a four-bladed helicopter rotor using the improved rotor blade of the present invention.

The improved helicopter rotor blade of the present invention provides the aerodynamic advantages of known rotor blades having an anhedral tip with the maintenance advantages of having a rotor blade tip which is removable and replaceable at the depot level. Referring to FIG. 1, a helicopter rotor 10 includes a hub member 12 which is conventionally supported from a helicopter fuselage to be driven for rotation about an axis of rotation 13. A plurality of helicopter blades 14 project substantially radially outward from the hub 12 and are supported therefrom in conventional fashion by a root attachment 16. Any number of blades 14 may be used with the rotor 10. The rotor illustrated partially in FIG. 1 is a four-bladed rotor with each blade separated circumferentially approximately 90°. Since each blade 14 will be identical, a single blade only will be described.

Each blade 14 includes a root portion 16 which attaches in a conventional fashion to the hub 12, a central portion 18 of aerodynamic shape, and a tip portion 20, which culminates in a blade tip 22. The blade portions 16, 18 and 20 cooperate with the hub 12 to define a blade radius R between the axis of rotation 13 and the blade tip 22. A blade chord C extends between a blade leading edge 24 and a blade trailing edge 26.

The shape of the rotor blade tip portion 20 is of a known shape of the type described in commonly owned U.S. Pat. No. 4,324,530 to Fradenburgh et al, or commonly owned U.S. Pat. No. 4,334,828 to Moffitt, the disclosures of which are incorporated herein by reference. The blade is fabricated with a selectively shaped tip which includes a selected combination of rearward sweep, taper and anhedral which coact to unload the blade tip, thereby producing a more uniform lift distribution throughout the span of the blade and also producing a more uniform downwash effect, as well as decreasing the power required to drive the rotor 10. The tip shape reduces the intensity of the tip trailing edge vortex and also directs or displaces the tip trailing edge vortex so that it causes minimal interference on the following blade.

Figure 2:
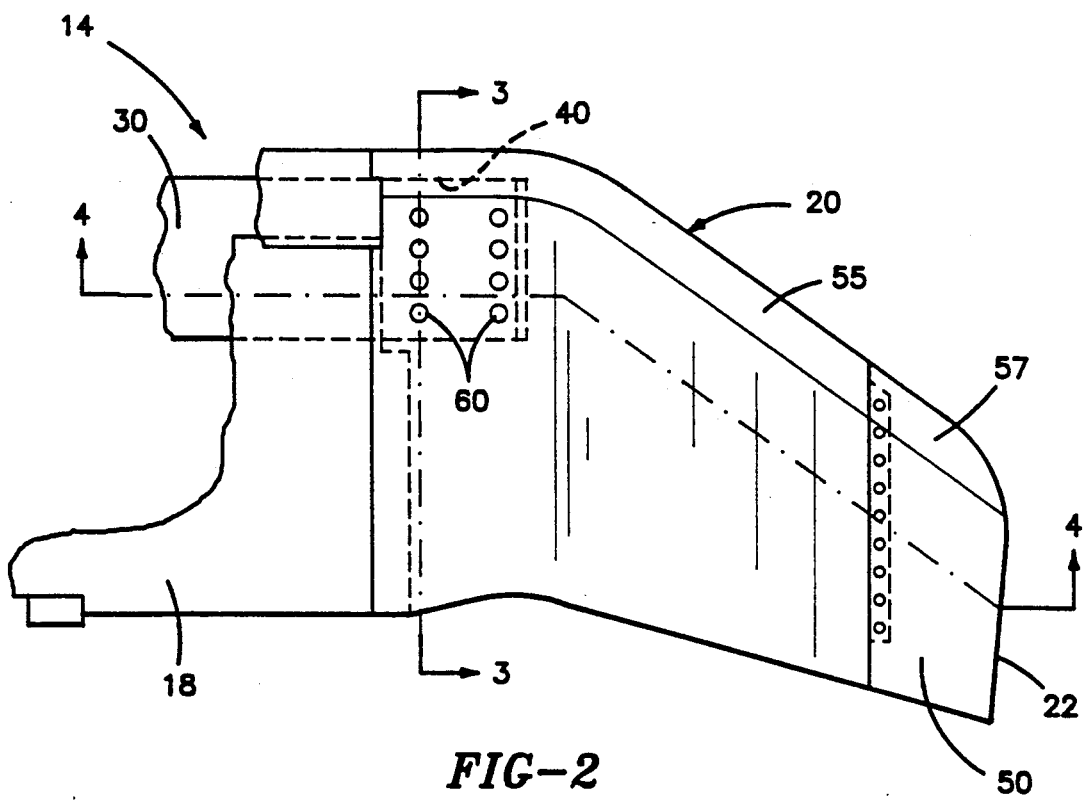
FIG. 2 is a top view of a replaceable anhedral tip of the present invention.
Figure 4:
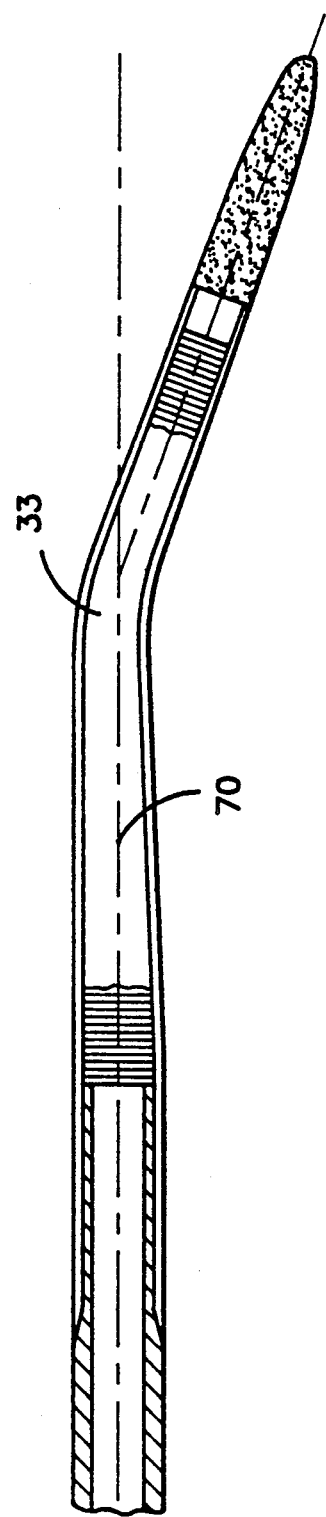
FIG. 4 is a cross-sectional view taken generally along line 4—4 of FIG. 2.

Referring also to FIG. 2, the blades 14 includes a spar 30 which extends from the root portion 16, through the entire length of the central portion 18, and into the tip portion 20 just prior to the anhedral droop 33 (FIG. 4). The spar 30 is a structural member having high torsional and axial stiffness and strength, and in the preferred embodiment is made of a high strength composite material. However, the spar may also be made from a high strength metal, such as titanium, which is known in the art. The internal portions of the blade (not including the spar) extending from the root portion 16 and through the length of the central portion 18 also includes a core material. The blade is covered by a composite skin which defines the aerodynamic shape of the blade.

Figure 3:
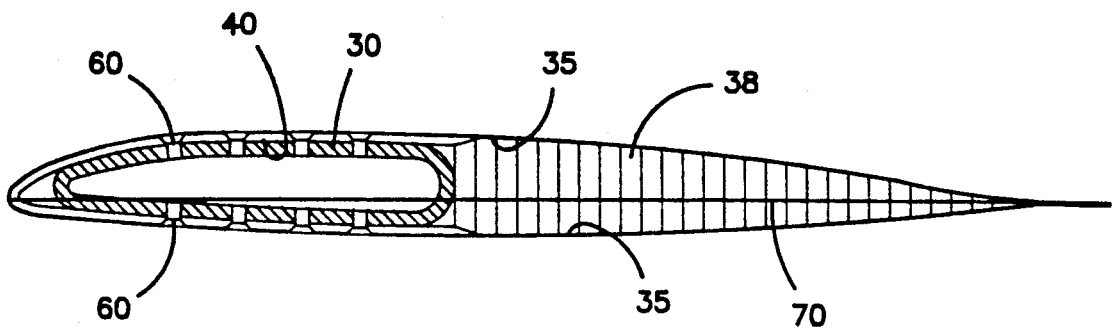
FIG. 3 is a cross-sectional view taken on line 3—3 of FIG. 2.

The tip portion 20 of the blade is defined as an area of the blade prior to the anhedral droop 33 (FIG. 4) and extending outwardly to the blade tip 22. In accordance with the present invention, the tip portion 20 is removably mounted to the central portion 18 of the blade. Referring to FIGS. 2 and 3, the tip portion 20 comprises a composite skin 35 covering a structural core 38. A recess 40 is formed in the core at the leading edge of the tip in the area between the central portion up to the anhedral droop. The internal diameter of the recess 40 is slightly larger than the external diameter of the spar 30 such that the spar can be received in the recess.

The tip portion 20 also comprises a tip cap 50 attached at the blade tip 22. Additionally, an abrasion strip 55 extends along the leading edge of the tip portion 20. An abrasion strip 57 is also mounted to the leading edge of the tip cap. The abrasion strip is made of a wear-resistant material, such as nickel, and is attached to the tip portion 20 and tip cap 50 using a low temperature curing, high strength adhesive such as epoxy paste adhesive.

As will be described in greater detail hereinafter, during assembly of the tip portion to the central portion, an adhesive material, such as epoxy film adhesive, is disposed on the mating surfaces of the rotor spar 30 and the recess 40. Additionally, adhesive material is applied to the area of the tip portion 20 which comes in contact with the central portion 18. The tip portion is then mounted on the central portion, the adhesive is cured, and fasteners 60 are used to attach the tip portion to the spar 30. In the preferred embodiment, threaded fasteners are used for mounting the tip to the spar. In the area where the tip portion 20 is mounted to the spar, the central portion blade skin is cut back, and a small flap of blade skin is received under a flap of tip skin. On the area of the blade from the spar back to the trailing edge of the blade, an approximately two inch flap of tip skin overlaps the skin of the central portion. Epoxy film adhesive is also used to bond these layers of skin.

The tip portion of the rotor blade may be assembled and attached to the central portion of the blade as illustrated in FIGS. 5a–5f. Referring to FIGS. 5a and 5b, the upper tip skin 35a and the lower tip skin 35b are formed by using a first pre-ply tool 65 and a second pre-ply tool 66. The first pre-ply tool 65 is used to lay-up the upper tip skin 35a and the second pre-ply tool 66 is used to lay-up the lower tip skin 35b. The skin is formed using layers of graphite fiber and fiberglass fiber. Typically, the entire skin comprises three layers of fiberglass fiber, and in the leading edge of the blade, where the blade is subject to the greatest wear and tear, layers of graphite fiber are added to further enhance the strength and durability of the skin.

Typically, the graphite layers are formed of conventional graphite rovings or fiber. These fibers generally have a tensile strength of about 500,000 psi to about 700,000 psi and may range in cross-section from about 0.00025 inch to about 0.00030 inch. The preferred graphite fibers are assembled in a sheet preimpregnated with a resin matrix, and are provided as a sheet (ply) of fiber material of a constant width, the sheet having a thickness of about 0.012 inches. The fiberglass fibers generally have a tensile strength of about 660,000 psi and a cross-section of about 0.00035 inches. The preferred fiberglass fibers are assembled in a sheet preimpregnated with a resin matrix, and are provided as a sheet (ply) of fiber material of a constant width, the sheet having a thickness of about 0.009 inches.

The resin matrix material which is useful in producing these structures is epoxy resins, such as 8552 which is commercially available from Hercules Corporation. However, any number of epoxy resin systems may be used, such as 5225 which is commercially available from BASF.

The three fiberglass layers and reinforcing graphite layers are laid-up into the first pre-ply tool 65 and the second pre-ply tool 66. Next, the fiber layers are debulked in the first and second pre-ply tools using a known debulking method. For example, a heat-resistant plastic sheet is draped over the entire tool, and the edges of the sheet are taped or otherwise adhesively attached to the tool. A port is attached to the sheet, and a vacuum is drawn on the area between the sheet and the composite plies. When the vacuum is drawn, atmospheric pressure pushes against the sheet which in turn pushes the composite layers against the pre-ply tools. When the vacuum is drawn on the port, the plies are known as being "under compaction". At room temperature, the plies are left in a compaction cycle for approximately one or two hours.

The purpose of debulking is to remove any air bubbles which may be trapped between the various ply layers. To aid in the escape of air bubbles, a "bleeder cloth" may be placed between the composite ply layers and the plastic sheet. The bleeder cloth does not become part of the ply layers, and it allows the escape of air bubbles through the port in response to the vacuum. To further aid in the adhesion of the various ply layers within the skin, epoxy film adhesive may be locally applied between the various layers during assembly to ensure all voids are properly filled with the resin matrix material.

The tools are made of a heat-resistant material, such as stainless steel, and the interior surfaces of the molds correspond to the final desired external shape of the tip portion. At the completion of the compaction cycle, the tool halves are cured in a high temperature process, such as in an autoclave, to cure the composite layers into a laminate which forms the tip skin. During the high temperature cure, the vacuum is maintained on the sheet covering the molds to maintain a pressure on the skin.

At the completion of the cure, the sheet is removed from the mold halves. Referring now to FIGS. 5c and 5d, honeycomb core material 38 is bonded to the cured skin laminate using a high strength adhesive, such as epoxy film adhesive. A high density honeycomb is used near the leading edge of the tip, and a lower density honeycomb is used on the trailing edge. The high density honeycomb section acts as a strengthening member, similar to the spar in the central portion of the blade. A portion of the high density honeycomb is cut away in the area corresponding to the spar recess 40. Once the honeycomb is securely bonded to the tip skin, it is machined along the chord plane 70 (FIGS. 3 and 4) of the blade. The machining can be accomplished in a high tolerance operation which closely controls the central chord of the blade.

When the machining of the tip halves is complete, the tip is assembled to the central portion of the blade using a clamshell type mold. Referring to FIG. 5e, adhesive is applied between the mold halves and at the mating surfaces between the tip portion and the central portion, including the overlapping skin. A clamshell mold having a lower half 72 and an upper half 73 is then placed over the assembled blade to hold the tip portion 20 in secure alignment with the central portion 18. The entire clamshell assembly is then cured in a high temperature process, such as in an autoclave, to cure the adhesive. Once the adhesive has completely cured, the clamshell mold is removed, and the fasteners 60 (FIGS. 2 and 3) are used to further secure the tip portion 20 to the spar 30.

A further layer of composite skin may be added to the leading edge of the tip portion to strengthen the tip and act as a wear resistant layer. This layer is also referred to as a "splice cap". The splice cap is formed using the aforementioned graphite plies. Referring to FIG. 5f, the graphite ply layers are applied to a male mold 78, and then a caul plate 80 is secured over the composite layers. The entire mold assembly is cured using a high temperature process to form the splice cap laminate 82. The splice cap is added to the blade tip when the clam shell is removed using a low temperature curing adhesive material such as epoxy paste adhesive.

The tip cap 50 is also formed using graphite fibers in a resin matrix. The tip cap is attached to the assembled tip portion 20 using fasteners such as screws or rivets. The mating interface on the tip cap that comes in contact with the tip portion 20 is machined to provide a precise mating surface.

If the tip portion 20 is damaged, it may be removed without damaging the remainder of the blade. The majority of the tip portion may simply be cut away. The fasteners 60 are removed and the layers of composite tip skin 35 may be peeled back, being careful not to damage the central portion of the blade. A low temperature source, such as dry ice, may be locally applied at the interface between the central portion and the tip portion. The adhesive material becomes brittle at extreme low temperatures and may be carefully chipped away to thereby remove the tip portion. When the damaged tip portion is completely removed, a new tip portion may be added as described hereinabove.

The tip portion 20 is described herein as being aligned with the central portion 18 using a clamshell mold. However, any suitable method of aligning the tip and central portion during curing of the adhesive may be used without departing from the present invention. Additionally, although the tip is described as having a honeycomb core, any suitable high strength, light weight material may be employed. Similarly, any suitable composite fiber having the desired strength and durability may be used to form the tip skin.

Although the invention has been shown and described with respect to exemplary embodiments thereof, it should be understood by those skilled in the art that the foregoing and other changes, omissions and additions may be made therein and thereto, without departing from the spirit and scope of the present invention.

We claim:

1. A rotary wing aircraft blade, comprising:
   a root portion adapted to be connected to a helicopter rotor hub for rotation therewith about an axis of rotation;
   a central portion of aerodynamic shape connected to and extending outwardly from said root portion;
   a structural spar extending along the blade longitudinal axis from said root portion to a spar tip end;
   a blade skin covering said spar and a blade structural core for defining said central portion aerodynamic shape;
   an upper tip skin layer;
   a lower tip skin layer;
   a replaceable tip structural core disposed between said upper and lower tip skin layers in a replaceable tip portion of said blade;
   a recess formed in said replaceable tip structural core for receiving said spar tip end; and
   fastening means for securely fastening said spar tip end within said recess, thereby fastening said replaceable tip portion to said blade.

2. A rotary wing aircraft blade according to claim 1 further comprising adhesive disposed between said spar tip end and said recess for fastening said replaceable tip portion to said blade.

3. A rotary wing aircraft blade according to claim 1 wherein a flap of said upper and lower tip skin layers extends radially inward from said tip portion beyond the structural core disposed therebetween, said flaps being adhesively attached to said blade central portion.

4. A rotary wing aircraft blade according to claim 1 wherein the density of said replaceable tip structural core varies from a leading edge of said tip portion to a trailing edge of said tip portion from a high density to a lower density.

5. A rotary wing aircraft blade according to claim 1 wherein said tip portion is selectively swept, tapered and anhedral.

6. A rotary wing aircraft blade according to claim 1 further comprising a composite tip cap fixed to an extreme tip end of said tip portion.

7. A replaceable tip portion for a rotary wing aircraft blade, the blade having a root portion adapted to be connected to a helicopter rotor hub for rotation therewith about an axis of rotation, a central portion of aerodynamic shape connected to and extending outwardly from said root portion, a structural spar extending along the blade longitudinal axis from said root portion to a spar tip end, and a blade skin covering said spar and a blade structural core for defining said central portion aerodynamic shape, the replaceable tip portion comprising:
   an upper tip skin layer;
   a lower tip skin layer;
   a replaceable tip structural core disposed between said upper and lower tip skin layers;
   a recess formed in said replaceable tip structural core for receiving said spar tip end; and
   fastening means for securely fastening said spar tip end within said recess, thereby fastening said replaceable tip portion to said blade.

8. A replaceable tip portion according to claim 7 further comprising adhesive disposed between said spar tip end and said recess for fastening said tip portion to said blade.

9. A replaceable tip portion according to claim 7 wherein a flap of said upper and lower tip skin layers extends radially inward from the tip portion beyond the structural core disposed therebetween, said flaps being adhesively attached to said blade central portion.

10. A replaceable tip portion according to claim 7 wherein the density of said replaceable tip structural core varies from a leading edge of said tip portion to a trailing edge of said tip portion from a high density to a lower density.

11. A replaceable tip portion according to claim 7 wherein said tip portion is selectively swept, tapered and anhedral.

12. A replaceable tip portion according to claim 8 further comprising a composite tip cap fixed to an extreme tip end of said tip portion.

13. A method for manufacturing a replaceable tip portion for a rotary wing aircraft blade, comprising the steps of:
   providing an upper tip skin mold and a lower tip skin mold, each mold having a lay-up surface for forming a tip skin surface;
   laying-up a plurality of ply layers in each mold, each ply layer comprising composite fibers in a matrix of binder;
   curing said ply layers to form an upper tip skin and a lower tip skin;
   attaching structural core material to said upper tip skin and to said lower tip skin thereby forming an upper tip portion and a lower tip portion;
   forming a recess in said structural core material having an inside diameter which corresponds to the shape of a rotor spar tip end; and
   machining said core material along a rotor blade chord plane;
   said machined core providing tight tolerance control in the assembly of said upper and lower tip portions as said replaceable tip portion.

14. The method according to claim 13 wherein said lay-up surfaces substantially provide the desired final exterior shape of said tip portion.

15. The method according to claim 14 wherein said upper and lower tip portions are selectively swept, tapered and anhedral.

16. The method according to claim 13 further comprising the step of debulking said ply layers prior to curing said upper and lower tip skin.

* * * * *